(No Model.)
J. L. CANHAM.
CAR FENDER.
No. 541,312. Patented June 18, 1895.
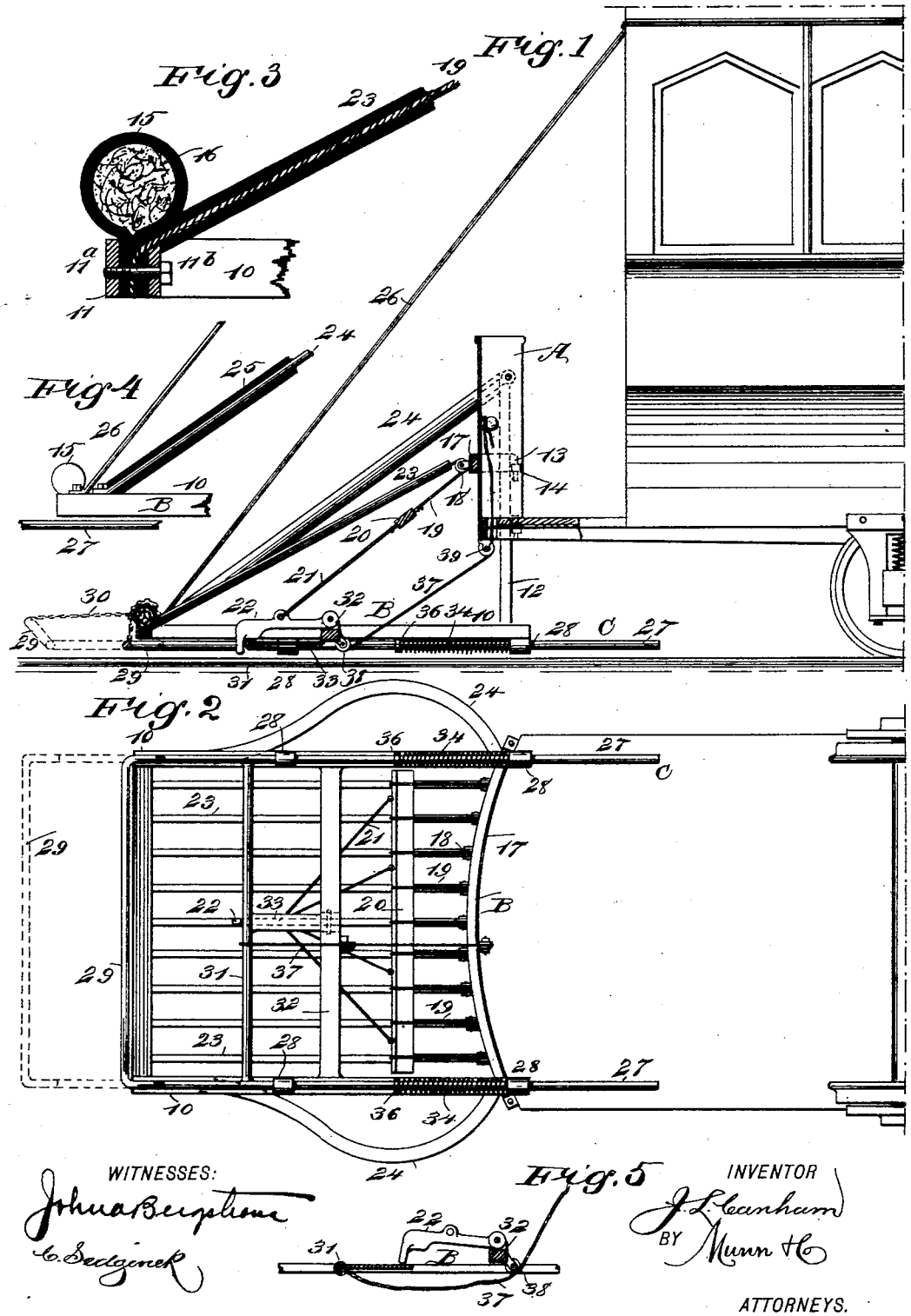
WITNESSES:
INVENTOR
J. L. Canham
BY Munn & Co
ATTORNEYS.

United States Patent Office.

JAMES LEWIS CANHAM, OF SOUTH ORANGE, NEW JERSEY, ASSIGNOR OF NINE-SIXTEENTHS TO ROBERT AVERY, OF BROOKLYN, NEW YORK, AND J. H. JACOBS, OF ORANGE, NEW JERSEY.

CAR-FENDER.

SPECIFICATION forming part of Letters Patent No. 541,312, dated June 18, 1895.

Application filed January 22, 1894. Serial No. 497,622. (No model.)

*To all whom it may concern:*

Be it known that I, JAMES LEWIS CANHAM, of South Orange, in the county of Essex and State of New Jersey, have invented a new and Improved Car-Fender, of which the following is a full, clear, and exact description.

My invention relates to an improvement in car fenders, and it has for its object to provide a car fender of exceedingly simple and durable construction, capable of attachment to or detachment from the dash-board or forward portion of a car, said fender being so constructed that when it contacts with a person the person will fall upon a yielding bed, and by so falling whereby the body in sagging will operate a trip and cause an auxiliary bed to be projected, which auxiliary bed will receive the person should he fall from the bed with which he was first brought in contact; and a further object of the invention is to provide a means whereby the auxiliary bed may be restored to its original position in a convenient and expeditious manner.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a partial sectional view through the platform of a car and a vertical section through the fender attached to said platform. Fig. 2 is a bottom plan view of the fender, and Figs. 3, 4, and 5 are detail views thereof.

In carrying out the invention the frame of the fender may be said to consist of two side bars 10, connected at the front by a cross bar 11 and upright bars 12, projected from the rear ends of the side bars 10, the said upright bars being provided with pins 13, as shown in dotted lines in Fig. 1, the said pins being adapted to enter eyes 14 located on the dash-board A of the car. The forward cross bar 11 is preferably made of two members $11^a$ and $11^b$, connected by series of bolts, as shown in Fig. 3, and between the two members $11^a$ and $11^b$ the lower ends of a tubular cushion 15, are secured, the said cushion preferably consisting of a body of rubber, leather, or other yielding material, provided with a suitable filling 16, or the rubber or leather body may be inflated by air, gas, or other material, the cushion being adapted to extend from end to end of the front cross bar 11.

An upper cross bar 17, is secured to the uprights 12 of the frame, the said upper bar being preferably bow-shaped, and it is adapted for engagement with the front face of the dash-board A of the car. This bow-bar 17, is provided with a series of friction rollers 18, and a series of cables 19, is made to pass over the said pulleys or friction rollers 18, the lower ends of the cables being secured between the members $11^a$ and $11^b$ of the front cross bar 11 of the frame. The cables 19, after being passed over the friction rollers or pulleys 18, are secured to a bar 20, which bar lies beneath the upper stretches of the cables, and a second series of cables 21, is secured to the said bar 20, adapted to extend downward, connect with and operate a latch 22 to be hereinafter described. The upper stretches of the cables 19, are covered by tubing 23 of rubber, or by rope, leather, or any other desired material, and the said upper stretches of the cables constitute a yielding bed upon which the person struck by the fender is adapted to fall; and the said yielding bed has an upward inclination in direction of the body of the car from the forward end of the frame.

The frame is provided with side bars 24, which are secured to the front portions of the sides 10, as shown in Fig. 4, and the said side pieces or bars are preferably curved upward and outward, and are made to engage with the rear uprights 12 near the upper portion of the dash-board A at the sides thereof.

The side-bars 24, are provided with a covering 25 of a yielding material, such as rubber, leather or their equivalents, whereby a cushioned surface is provided therefor, and a similar covering is likewise provided for the bow cross bar 17, at the upper rear portion of the frame. The frame is supported in a horizontal position preferably through the medium of braces 26, attached to the forward portion of the sides of the frame and to the upper portion of the car, the attachment to the car being effected in a detachable manner.

In addition to the main frame or fender above described, which main frame or fender may be designated as B, an auxiliary or extension frame or fender C is employed, located beneath the main frame. The auxiliary frame consists preferably of two side bars 27, held to slide in bearings 28 secured upon the side bars of the main frame, and a front cross bar 29, shaped somewhat as a bow or yoke, the said front bars being pivotally connected with the side bars 27, and the front bar 29, is capable of extending upward at an angle to the side bars.

The front bar 29 of the auxiliary frame is provided at or near each end with a chain or cable 30 attached thereto, shown in dotted lines in Fig. 1, which chain or cable is secured likewise to the front bar 11 of the main frame or to a point adjacent thereto; and the length of the chains or cables 30 is such that the auxiliary frame C may be carried a predetermined distance forward of and beyond the main frame, the front bar 29 at the same time being carried upward, as is also shown in dotted lines in Fig. 1. The side bars 27 of the auxiliary frame are connected by a forward cross bar 31, and between the forward cross bar 31 and on the front bar 29 of the auxiliary frame a netting or wire bed of any description is secured. Back of the cross bar 31 of the auxiliary frame a cross bar 32, is located, connecting the side bars 10 of the main frame, and upon this latter cross bar the latch 22 heretofore referred to and to which the auxiliary cables 21 are attached, is pivotally secured, the latch being adapted for engagement with the cross bar 31 of the auxiliary frame; and a plate 33 is projected from the central portion of the cross bar 31 in a forward direction beneath the latch 32. The auxiliary frame C is spring-controlled, its side bars being encircled by springs 34, which springs bear against the rear bearings 28 of the auxiliary frame and against collars 36 located on the side bars of the auxiliary frame, as is best shown in Figs. 1 and 2.

In practice the front bar 29 of the auxiliary fender is covered with rubber, rope, leather, or any other preferred material, or a cushion substantially like that of 15 shown in connection with the frame 10 is employed. Thus in operation, when the auxiliary frame is drawn rearward, compressing the springs 34, it is held in that position by the latch 22, and in the event a person should be struck by the fender he will fall upon the bed formed by the cables 23 and their coverings, and will compress said cables at their upper stretches, and therefore draw the trip bar 20 upward, and in so doing the latch 22 will be disengaged from the auxiliary frame and the springs 34 of said frame will act to force said auxiliary frame forwardly, as shown in dotted lines in Figs. 1 and 2, and provide a support for the person struck should he slip from the upper yielding bed, while the side arms 24, will prevent the person from falling from the sides of the fender, since a lattice-work, or braces equivalently constructed, will be projected from said side arms to the side bars of the main frame. The auxiliary frame is drawn back to its original or normal position by a cable 37, which may be attached to the cross bar 31 of the auxiliary frame and passed over the pulley 38 upon the cross bar 32 of the main frame, and thence around another pulley 39, located upon the bottom of the platform of the car to a point within convenient reach of the driver or motorman. It is evident that the cushion located upon the forward cross bar 11 of the main frame will prevent the person struck by the fender from being injured, while said cushion will also act as a barrier to prevent said person or persons from slipping entirely from the upper yielding bed of the fender.

Having thus described my invention, I claim as new and desire to secure by Letters Patent—

1. In a car fender, the combination with a main fender, of a sliding and spring actuated auxiliary fender carried by the main fender and provided with a hinged section adapted to be swung up when the auxiliary fender is projected, a latch for holding the auxiliary fender retracted, and a connection between the latch and main fender for operating the latch when an object falls upon the main fender, substantially as described.

2. In a car fender, the combination, with a body frame provided with a series of cables arranged to form a bed, and a latch carried by the body frame beneath the bed and in trip engagement with the cables thereof, of a spring-controlled frame having sliding movement beneath the body frame and adapted to be engaged by said latch, the lower frame being likewise provided with a yielding bed, as and for the purpose specified.

3. In a car fender, the combination with a frame provided with a series of cables forming a yielding bed, of a sliding and spring actuated auxiliary frame having a hinged outer section, a flexible connection between the outer section of the auxiliary frame and the main frame, a latch carried by the main frame and engaging the auxiliary frame, and a connection between the latch and the yielding bed of the main frame, substantially as described.

4. In a car fender, the combination, with a body frame, a series of cushioned cables arranged to form an inclined bed on the said body frame, a latch carried by the body frame, and a connection between the cables of said bed and the latch, whereby when the bed is depressed the latch is elevated, of an auxiliary frame having sliding and spring-controlled action beneath the body frame, the said auxiliary frame being provided with a keeper adapted to be engaged by the said latch, whereby the auxiliary frame will be held substantially concealed beneath the main frame, a bed located upon the auxiliary frame, and a pivoted section forming a portion of the forward end of the auxiliary frame, connected with the bed of the latter, and stops connected with said pivotal section, whereby when the auxiliary frame is forced inwardly beyond the main frame, the pivoted section will be given an upwardly inclined direction, substantially as and for the purpose specified.

5. In a car fender the combination, with a body frame, a series of cushioned cables arranged to form an inclined bed on the said frame, a latch carried by the body frame, and a connection between the cables of the bed and said latch, whereby when the bed is depressed the latch will be elevated, of an auxiliary frame having sliding and spring-controlled action beneath the body frame, the said auxiliary frame being provided with a keeper adapted to be engaged by the said latch, whereby the auxiliary frame will be held substantially concealed beneath the main frame, a bed located upon the auxiliary frame, a pivoted section forming a portion of the forward end of the auxiliary frame, connected with the bed of the latter, stops connected with the said pivotal section, whereby when the auxiliary frame is forced inwardly beyond the main frame, the pivoted section will be given an upwardly-inclined direction, a return mechanism connected with the auxiliary frame, side fenders connected with the main frame, and stays whereby the entire device is held in proper position, as and for the purpose set forth.

6. In a car fender, the combination, with a main frame provided with a cushion at its forward end, cables leading from said cushion in an upwardly direction to the rear portion of the main frame, passed over pulleys and connected with the trip bar, forming a bed, cushions located upon said cables between the pulleys and lower end of the main frame, a latch carried by the main frame, and a connection, substantially as shown and described, between the latch and the trip bar, of an auxiliary frame having spring-controlled and sliding movement beneath the main frame, and provided with a pivoted section at its forward end and a yielding bed at said end, a keeper located upon the auxiliary frame, and adapted for engagement with the latch, and means, substantially as shown and described, for regulating the inward and upward throw of the auxiliary frame, as and for the purpose specified.

JAMES LEWIS CANHAM.

Witnesses:
AUSTIN ADAMS, Jr.,
WM. READ HOWE.